March 5, 1963   S. A. DIER ET AL   3,079,680
METHOD OF MAKING SOCKETS
Filed July 29, 1959   2 Sheets-Sheet 1

Inventors
Stephen A. Dier
Albert W. Gair
by Hill, Sherman, Meroni, Gross & Simpson Attys March 5, 1963 S. A. DIER ET AL 3,079,680
METHOD OF MAKING SOCKETS
Filed July 29, 1959 2 Sheets-Sheet 2
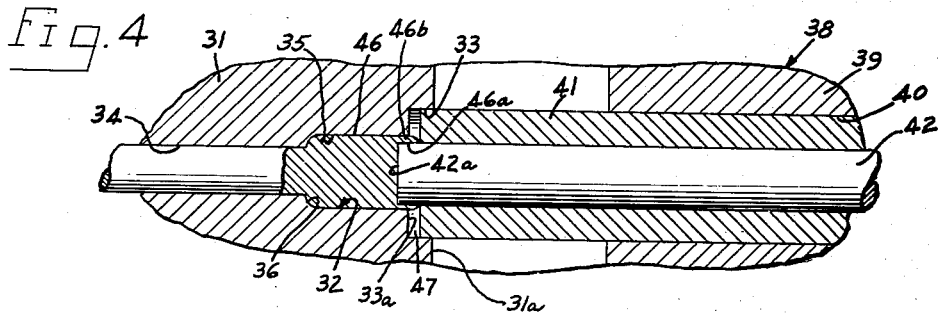
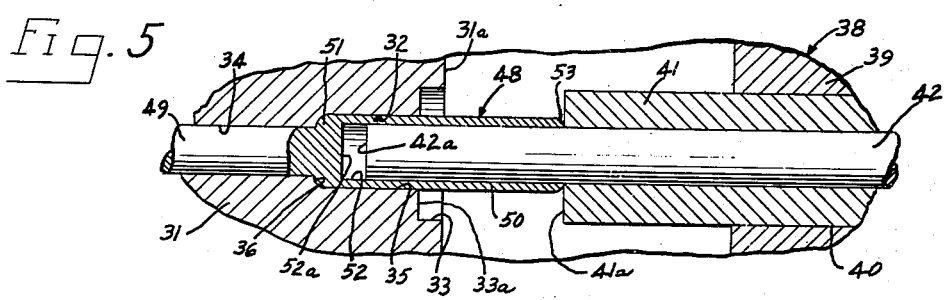
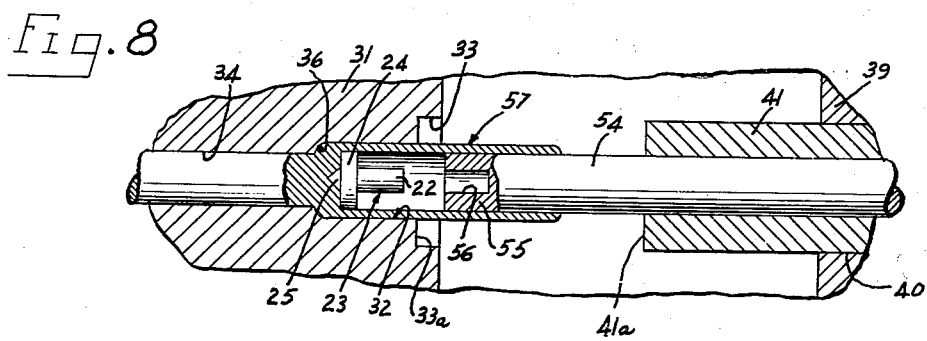
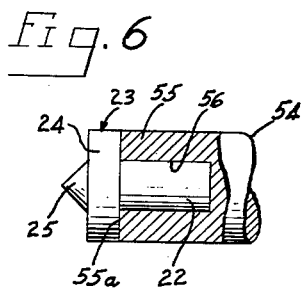
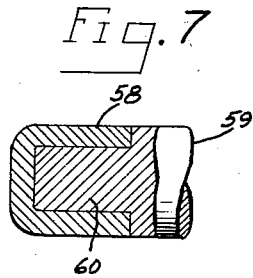
Inventors
Stephen A. Dier
Albert W. Gair 3,079,680
METHOD OF MAKING SOCKETS
Stephen A. Dier, Warren, and Albert W. Gair, Fraser, Mich., assignors to Thompson Ramo Wooldridge Inc., Cleveland, Ohio, a corporation of Ohio
Filed July 29, 1959, Ser. No. 830,239
3 Claims. (Cl. 29—432)

The present invention relates broadly to the art of metal forming, and is more particularly concerned with a novel method of extruding sockets of the character employed in vehicular steering linkages.

It is an important aim of the present invention to provide a method of making tubular sections closed at one end thereof and which features advancing an elongated punch member forwardly into a confined solid metal body to cause a rearward metal flow of the body along the outer diameter of the punch member to form the tubular section.

Another object of this invention lies in the provision of a method of forming tubular members provided with an integral solid shank at one end utilizing only a single die member and a single punch assembly of relatively simple construction, and by which a solid metal rod may be continuously extruded into socket configuration producing a structure of superior physical properties and at substantial time savings as compared with existing structures and methods.

A further object of this invention is to provide a method of making a tubular member having an integral solid shank at one end and which features the steps of confining an enlarged solid head portion on a metal bar against radial expansion and against axial movement in one direction, and moving the head portion relative to an elongated punch surface to direct said surface into the head portion while flowing the metal mass from said head portion along the outer diameter of the punch surface and in the opposite axial direction to form a tubular head section integral with a reduced diameter solid shank section.

A still further object of the instant invention lies in the provision of apparatus for making a tubular member provided with an integral solid shank at one end, and which embodies a die member having a stepped cavity therein providing a relatively large diameter mouth portion, a relatively small diameter end portion, and an intermediate diameter portion connecting the mouth and end portions; and a punch assembly comprising a supporting member, a sleeve member received in the supporting member and movable relative thereto, and a punch member slidable within the sleeve member, the sleeve member being sized to the diameter of the die cavity mouth portion and the punch member being of lesser diameter than the die cavity intermediate portion, whereby an enlarged solid head portion of a metal bar confined in the cavity intermediate portion is extruded axially along the punch outer diameter while simultaneously the sleeve member is moved in the same axial direction by the extruding metal mass.

Other objects and advantages of the invention will become more apparent during the course of the following description, particularly when taken in connection with the accompanying drawings.

In the drawings, wherein like numerals designate like parts throughout the same:

FIGURES 2 to 5 are fragmentary sectional views showing successive steps in the formation of a socket from a solid metal rod;

FIGURES 6 and 7 are enlarged fragmentary sectional views of punch inserts which may be used in the practice of the instant method; and FIGURE 8 is a fragmentary sectional view of a step of this method, generally corresponding to the step of FIGURE 5, and in which the punch insert of FIGURE 6 is employed.

Briefly stated, a tubular section is formed on an end of a round bar in accordance with the instant method by locating a length of round bar stock in a stationary die member having a stepped cavity therein providing a relatively large diameter mouth portion, a relatively small diameter end portion, and an intermediate diameter portion connecting the mouth and end portions. The diameter of the bar stock corresponds to the diameter of the cavity end portion, and one end of the bar stock bottoms against the end of the cavity end portion. With the bar stock so seated in the die member cavity, a punch assembly is then advanced toward the bar stock.

The punch assembly comprises an outer supporting member receiving a sleeve member movable relative to the support, and a punch member which is slidable within the sleeve member. Advancement of the punch assembly locates one end of the sleeve member in bottoming contact with the die cavity mouth portion, and slidable movement of the punch member within the sleeve member and against one end of the seated bar stock extrudes or bulges the stock at one end to conform with the die cavity intermediate portion, thereby forming an enlarged head on the bar stock. Continued advancement of the punch member within the sleeve and against the stock head portion, with the sleeve member seated against the die cavity mouth portion, initiates a backward extrusion of the metal mass in the head portion. This backward extrusion of the metal mass causes rearward axial travel of the sleeve member and a flowing of the metal mass along the outer diameter of the punch member. The punch member is continuously advanced into the enlarged head portion of the bar stock to elongate the head portion along the punch outer diameter until a tubular section of the desired axial length and wall thickness is provided. Other features of the invention include punch inserts to be mounted on the punch active end, and these inserts are ejected from the punch active end when the punch member is withdrawn, to leave at the base of the socket a stop which bottoms the spring of the socket assembly. Further features of this method will be brought out in the detailed description which now follows.

The present method is of proven successful application in the formation of sockets of the horizontal type employed with drag links, tie rods and the like in vehicular steering linkages. The method will accordingly be specifically described in this connection herein; however, it will be apparent to those skilled in the art that the disclosed and claimed forming method is additionally of substantial utility in the production of articles having other end uses.

Figure 1:
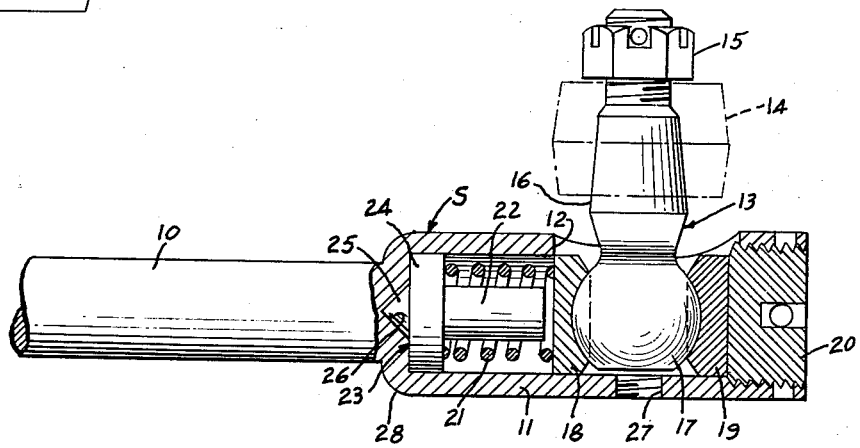
FIGURE 1 is an enlarged fragmentary side elevational view, with parts in section, showing a socket as produced in accordance with the principles of this invention and mounting therein an illustrative form of ball stud.

Referring now first to FIGURE 1, there is shown a socket assembly generally designated by the legend S and formed in accordance with the principles of this invention. The socket S comprises a solid shank portion 10 and an integral tubular head portion 11 at one end thereof. The head portion 11 has one side wall thereof apertured as at 12 to receive a ball stud 13, which in turn may mount a Pitman arm connection 14 held thereon by nut means 15. The ball stud 13 is provided with a relatively slender stem or shank portion 16 connecting with a rounded head portion 17 received in a pair of button bearings 18 and 19. The bearing 19 is held in position by a plug 20 threaded into the open end of the socket tubular portion 11, and the opposite bearing 18 is bottomed by one end of a spring 21 received about a shank 22 of a spring bottoming or stop member 23. The spring 21 may be seen to bottom at its opposite end against a collar 24 formed on the stop 23, and the stop may further be formed with a pyramidal head 25 which seats in a cavity 26 of complementary shape. The ball stud head portion 17 and bearings 18 and 19 may be lubricated through a hole or opening 27 in another side wall of the socket tubular head portion 11.

The socket S is formed of any of the known steels suitable for this purpose, and the socket may be seen to have a solid shank portion 10 of round cross-section connecting with the tubular head portion 11 by a rounded shoulder portion 28. The tubular portion 11 has concentric inner and outer diameters throughout, and as will be later described in connection with FIGURES 6 and 8, the stop or spring bottoming means 23 may be located in the position shown interiorly of the tubular portion as a step in the forming method.

Figure 2:
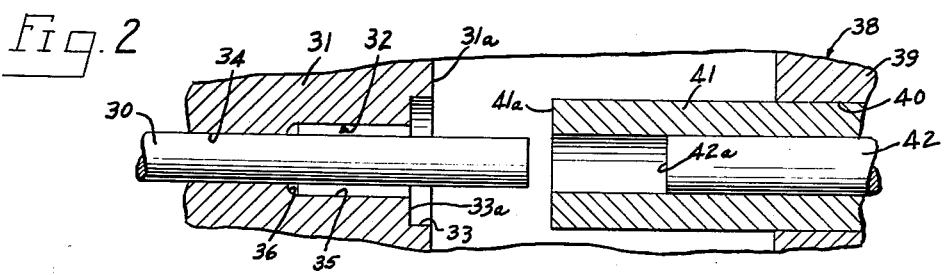
Figure 3:
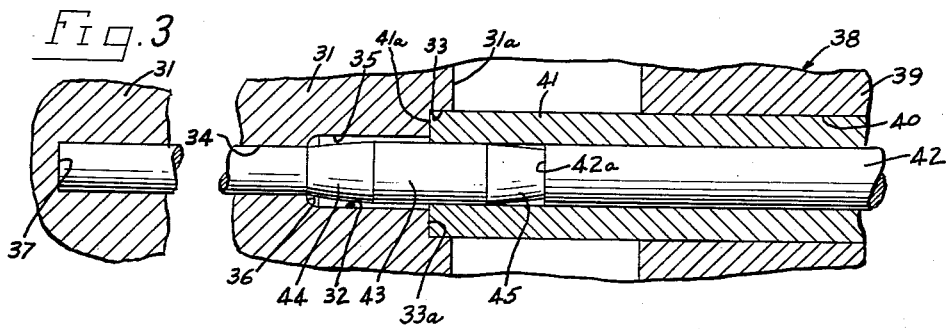

The forming process is initiated by locating round bar stock 30 of a predetermined length in a die member 31 in the manner shown in FIGURE 2. The die member 31 has a stepped cavity 32 provided therein, and the cavity comprises a relatively shallow mouth portion 33 having a relatively large diameter and connecting with a relatively small diameter cavity end portion 34 by an intermediate diameter cavity portion 35. The intermediate diameter cavity portion 35 connects with the cavity end portion 34 by means of a generally rounded shoulder 36, and as shown in FIGURE 3, the cavity end portion 34 terminates at 37 in the die member 31. The cavity end portion 34 is sized to the diameter of the bar stock 30, and when the bar stock is seated in the die cavity 32, one end of the stock bottoms against the cavity wall 37 to restrain the stock against axial travel during the forming operation. As located in the position shown in FIGURE 2, the work piece or bar stock 30 is concentrically spaced from the cavity mouth and intermediate portions 33 and 35, and one end of the bar stock protrudes axially outwardly from the cavity 32, or as may be otherwise stated, from surface 31a of the die member 31.

The die member 31 is preferably held stationary during practice of the steps of this method, and employed with the die member 31 is a punch assembly generally designated by the numeral 38. The punch assembly 38 comprises a movable outer support member 39 having an opening 40 therein slidably receiving a movable annular sleeve member 41 of concentric inner and outer diameters. Received by the sleeve member for axially slidable movement therewithin is a punch member 42 of round cross-section and having a substantially flat active end face 42a. It will now be seen that the support member 39, sleeve member 41 and punch member 42 of the punch assembly 38 are movable relative to one another, and suitable means are of course provided to effect this relative movement.

As an initial step in the practice of the instant method, the punch assembly 38 is advanced toward the die member 31 with the bar stock 30 located therein as shown in FIGURE 2. During this advancement relatively flat face 41a of the sleeve member 41 abuts against bottom wall 33a of the cavity mouth portion 33, as illustrated in FIGURE 3, and one end of the sleeve member 41 is thereby received in or housed by the cavity mouth portion 33. Movement of the sleeve member 41 is then terminated, and sequentially thereafter the punch member 42 is directed forwardly toward the bar stock 30 and relative to the sleeve member 41 to initially form the bar stock to the configuration shown in FIGURE 3.

By action of the punch member active end 42a against the restrained bar stock 30, and while the cavity intermediate portion 35 is closed by the sleeve member 41 at one end thereof, the end portion of the bar stock 30 outwardly of the cavity shoulder portion 36 is radially or transversely bulged as indicated in FIGURE 3. The end portion of the bar stock during compaction may have an intermediate expanded section 43 of maximum diameter connecting at opposite ends with tapered expanded portions 44 and 45. Ultimately however, as the punch member 42 continuously advances against the restrained bar stock 30, the end portion of the bar stock occupies the entire closed intermediate cavity portion 35 extending from the cavity shoulder portion 36 to the flat end wall 41a of the sleeve member 41.

This is illustrated in FIGURE 4 which shows the stock head portion as the punch member active end 42 moves therein. However, prior to the punch member initiating a metal flow therealong, the closed intermediate cavity portion 35 is entirely filled by the metal mass provided by the bar stock portion extending axially outwardly from the cavity shoulder portion 36, as shown in FIGURE 2. Upon completion of the forming step shown in an intermediate status in FIGURE 3, the bar stock has an enlarged head portion 46 (FIGURE 4) thereon, which as earlier noted completely fills the intermediate closed cavity portion 35. It may thereby be seen that the stock head portion 46 is confined against transverse or radial outward movement by the side walls of the cavity intermediate portion 35, and further, is confined against axial movement in a direction opposite to the direction of punch movement by the cavity shoulder portion 36.

As the punch member 42 is advanced continuously against the confined stock head portion 46, the punch active end 42a penetrates or enters the metal mass in the head portion 46 essentially as shown in FIGURE 4. As illustrated therein, the punch active end 42a initially forms a recess 46a in the head portion 46, or as otherwise stated, the metal mass at the punch end of the head portion 46 extrudes in a direction opposite to the direction of punch movement or rearwardly to form an annular neck section 46b on the stock head portion 46. During rearward or backward metal movement and forward punch movement, forming the annular neck portion 46b, the outer end of the continuously extending neck portion exerts a rearward axial force against the essentially flat end face 41a of the sleeve member 41 to move said sleeve member in the direction of metal flow. As shown in FIGURE 4, the annular neck portion 46b is in sliding hugging contact with the punch outer diameter, and in the illustrated phase of the forming step the sleeve member 41 has receded approximately one-half of the depth of the cavity mouth portion 33 to open a space 47 between the sleeve end face 41a and the bottom wall 33a of the cavity mouth portion 33.

Continued advancement of the punch member active end 42a into the enlarged and restrained head portion 46 of the stock produces a shape essentially as shown in FIGURE 5. This view illustrates the completion of the extrusion operation and shows retraction of the punch member 42 subsequent thereto. The sleeve member 41 has been driven rearwardly by the moving annular metal mass a distance essentially equal to that of the mass extending outwardly from the surface 31a of the die member 31. The entire punch assembly 38 is then completely retracted to a position generally that shown in FIGURE 2, and the die member 31 may be opened to remove the formed part therefrom.

The part as produced by the steps described is indicated by the numeral 48 in FIGURE 5, and may be seen to comprise a solid shank portion 49 and a tubular head portion 50 which connects with the shank portion 49 by a rounded shoulder portion 51 conforming to the contour of the die cavity shoulder 36. The tubular portion 50 accordingly has a cylindrical cavity 52 formed therein with an essentially straight bottom 52a conforming to the essentially flat active end 42a on the punch 42. By the steps described, the annular head portion 50 of the extruded part 48 has concentric inner and outer diameters, and it may be found that adjacent or outwardly of the open end of the tubular portion 50 the walls are slightly tapered, as at 53, and this taper may be removed in the finishing operations.

The shaped article 48 of face FIGURE 5 is then finished to produce a socket S as shown in FIGURE 1. The open end of the formed part 48 is threaded to receive the plug 20, the apertures 12 and 27 are provided therein and the end wall 52a of the head portion cavity 52 formed to receive the spring bottoming device 23. However, as will now be described, the end wall or spring bottoming device 23 may be located essentially as shown in FIGURE 1 by using it as a separable punch nose in the extruding step.

Referring to FIGURE 6, a punch member 54 may be provided having an end portion 55 with a recess 56 formed therein to receive the shank portion 22 of the end wall or spring bottoming means 23. The collar portion 24 of the stop or spring bottoming means 23 abuts as shown against end wall 55a of the punch end portion 55.

A punch of the character shown in FIGURE 6 is employed with an identical die member 31 and identical support member 39 and sleeve member 41, as shown in FIGURE 8. Like numerals have accordingly been applied to like parts in this view, and upon completion of the extrusion operation the punch 54 is withdrawn to leave embedded in the formed metal mass the spring bottoming device 23. Metal movement in all other respects is the same as earlier described in connection with the preceding views, and one advantage of the punch construction shown in FIGURES 6 and 8 is a relatively longer tool life. In addition, since the spring bottoming device 23 is embedded in formed part 57 as part of the extrusion operation, subsequent finishing of the part 48 is not required to receive the stop or spring bottoming device.

The use of the end wall 23 as a separable nose on the punch 54 provides a new active end on the punch for each extruding operation and maintains desired dimensions for the cavity being formed. Machining steps can be eliminated and sharp corners can be provided at the end of the cavity by this removable nose to prevent interference with inserted components. The nose can assume any desired shape and need not have a spring bottoming function. Since it is tightly embedded in the metal being pierced and extruded, the punch nose can be readily released from the punch by rearward punch movement to leave the nose secured in the end of the cavity.

In substitution for the male punch insert or nose 23 of FIGURES 6 and 8 there may be employed a female punch insert or nose 58 as shown in FIGURE 7. A punch member 59 may have a solid head or tongue portion 60 provided at one end thereof receiving in relatively tight fitting contact the cap member nose or female punch insert 58. The nose 58 may thus be seen to be essentially in thimble form and surrounds the finger or head portion 60 of the punch 59. In the manner described in connection with FIGURES 6 and 8, the nose or punch insert 58 is embedded in the base of the interior of the tubular section, and upon retraction of the punch 59 remains therein to bottom a suitable spring structure.

The punch member construction employed in the practice of the steps of the instant invention may accordingly be seen to be susceptible of wide variations.

The sockets formed by this invention are finished for use as housings for ball joints of the type shown in FIGURE 1 by punching a keyhole slot or other aperture 12 in the side wall for receiving the ball stud 13 and by internally threading the open end for receiving the plug 20. The tapped hole 27 for a grease fitting may be formed by punching or drilling the side wall.

It is to be understood that many changes and modifications from the herein specifically described and illustrated embodiments may be effected without departing from the novel concept of this invention.

We claim as our invention:

1. A method of making a tubular member having an integral solid shank of smaller diameter at one end which comprises:
    confining and restraining one end of a rod member of a predetermined length and uniform diameter against axial and radial movement,
    upsetting the other end of said rod member while said one end is confined and restrained to form an enlarged head portion with said other end integral with an elongated shank portion of said one end,
    confining and restraining the upset end against radial expansion and against axial movement in the direction of said one end, and
    while continuously maintaining the solid shank section stationary and the upset end restrained, moving an elongated punch of uniform diameter in the direction of said one end and into said upset end while flowing the metal mass from said upset end along the outer diameter of said punch in the direction opposite the direction of movement of said punch to form a tubular head section integral with a solid shank section of smaller diameter.

2. A method of making a tubular member having an integral solid shank of smaller diameter at one end in accordance to the method of claim 1 wherein said elongated punch member has a spring bottoming device releasably attached thereto, and embedding said spring bottoming device in the base of the formed tubular section by said punch member during the formation of said tubular head section.

3. A method of making a tubular member having an integral solid shank of smaller diameter at one end which comprises:
    locating a rod member of predetermined length and uniform diameter in a cavity having a relatively large diameter mouth portion, a relatively small diameter end portion having a diameter equal to the diameter of the rod member, and an intermediate diameter portion connecting the mouth and end portions,
    confining and restraining one end of said rod member against axial and radial movement by bottoming the one end of the rod member in said cavity end portion, the other end of said rod member extending outwardly from said intermediate cavity portion,
    partially closing said intermediate cavity portion by a sleeve member telescoped in spaced relationship over said other end of said rod member and inserted in the cavity mouth portion,
    upsetting the other end of said rod member while said one end is confined and restrained to fill the cavity intermediate portion and form an enlarged head portion with said other end integral with an elongated shank portion of said one end,
    confining and restraining the upset end against radial expansion and against axial movement in the direction of said one end, and
    while continuously maintaining the solid shank section stationary and the upset end restrained, moving an elongated punch of uniform diameter in the direction of said one end and into said upset end while flowing the metal mass from said upset end along the outer diameter of said punch in the direction opposite the direction of movement of said punch to move the sleeve member from said cavity mouth portion and form a tubular head section integral with a solid shank section of smaller diameter.

References Cited in the file of this patent

UNITED STATES PATENTS

| | | |
|---|---|---|
| 1,314,037 | Amberg | Aug. 26, 1919 |
| 1,568,030 | Wilcox | Dec. 29, 1925 |
| 1,610,769 | Graham | Dec. 14, 1926 |
| 1,670,532 | Crawford | May 22, 1928 |
| 1,978,371 | Putrell | Oct. 23, 1934 |
| 2,261,304 | Sparks | Nov. 4, 1941 |
| 2,368,695 | Wilber | Feb. 6, 1945 |
| 2,667,650 | Friedman | Feb. 2, 1954 |
| 2,778,494 | Kreidler | Jan. 22, 1957 |
| 2,904,173 | Braun et al. | Sept. 15, 1959 |

FOREIGN PATENTS

| | | |
|---|---|---|
| 497,270 | Great Britain | Dec. 15, 1938 |